United States Patent
Jain et al.

(10) Patent No.: US 9,344,325 B2
(45) Date of Patent: May 17, 2016

(54) SYSTEM, METHOD AND APPARATUS PROVIDING MVPN FAST FAILOVER

(71) Applicants: Pradeep G Jain, Mountain View, CA (US); Kanwar D Singh, Mountain View, CA (US); Jayant Kotalwar, Mountain View, CA (US); Nehal Bhau, San Jose, CA (US); Wim Henderickx, Antwerp (BE)

(72) Inventors: Pradeep G Jain, Mountain View, CA (US); Kanwar D Singh, Mountain View, CA (US); Jayant Kotalwar, Mountain View, CA (US); Nehal Bhau, San Jose, CA (US); Wim Henderickx, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 378 days.

(21) Appl. No.: 13/767,519

(22) Filed: Feb. 14, 2013

(65) Prior Publication Data

US 2014/0029419 A1    Jan. 30, 2014

Related U.S. Application Data

(60) Provisional application No. 61/676,796, filed on Jul. 27, 2012.

(51) Int. Cl.
| | |
|---|---|
| *H04L 12/24* | (2006.01) |
| *H04L 12/703* | (2013.01) |
| *H04L 12/707* | (2013.01) |
| *H04L 12/723* | (2013.01) |
| *H04L 12/913* | (2013.01) |
| *H04L 12/751* | (2013.01) |
| *H04L 12/803* | (2013.01) |

(52) U.S. Cl.
CPC ........ *H04L 41/0668* (2013.01); *H04L 41/0654* (2013.01); *H04L 41/0659* (2013.01); *H04L 41/0686* (2013.01); *H04L 45/026* (2013.01); *H04L 45/22* (2013.01); *H04L 45/28* (2013.01); *H04L 45/50* (2013.01); *H04L 47/125* (2013.01); *H04L 47/724* (2013.01)

(58) Field of Classification Search
None
See application file for complete search history.

(56) References Cited

U.S. PATENT DOCUMENTS

| | | | |
|---|---|---|---|
| 7,602,702 B1 | 10/2009 | Aggarwal | |
| 7,948,996 B2 | 5/2011 | Kompella | |
| 8,014,275 B1 * | 9/2011 | Sundt et al. | 370/217 |
| 8,243,587 B2 | 8/2012 | Darwish | |
| 8,521,896 B2 * | 8/2013 | Liu | H04L 12/4633 370/352 |
| 8,644,325 B2 | 2/2014 | Iovanna et al. | |
| 8,693,339 B2 | 4/2014 | So | |
| 8,797,886 B1 * | 8/2014 | Kompella | 370/248 |

(Continued)

FOREIGN PATENT DOCUMENTS

WO    WO 2006/044217 A1    4/2006

OTHER PUBLICATIONS

RFC 5880—Bidirectional Forwarding Detection, Juniper Networks, ISSN: 2070-1721, Jun. 2010.*

(Continued)

*Primary Examiner* — Redentor Pasia
(74) *Attorney, Agent, or Firm* — Tong, Rea, Bentley & Kim, LLC

(57) ABSTRACT

A system, method and apparatus of failover indication of a Multicast Virtual Private Networking (MVPN) P-Tunnel at a leaf provider equipment (PE) router. Border Gateway Protocol (BGP) Bidirectional Forwarding Detection (BFD) attributes may be adapted to associate a BFD discriminator with a P-Tunnel terminated at the Leaf PE router such that BFD session status may be used to indicate a tunnel failure condition.

21 Claims, 3 Drawing Sheets

(56) References Cited

U.S. PATENT DOCUMENTS

| | | | |
|---|---|---|---|
| 8,902,780 B1* | 12/2014 | Hegde et al. | 370/252 |
| 8,953,590 B1* | 2/2015 | Aggarwal et al. | 370/389 |
| 2006/0092952 A1 | 5/2006 | Boutros et al. | |
| 2006/0140111 A1 | 6/2006 | Vasseur et al. | |
| 2006/0209716 A1 | 9/2006 | Previdi et al. | |
| 2007/0047469 A1 | 3/2007 | Vasseur et al. | |
| 2007/0070914 A1* | 3/2007 | Abigail | 370/252 |
| 2007/0124453 A1* | 5/2007 | Slaughter et al. | 709/223 |
| 2008/0069007 A1 | 3/2008 | Vasseur et al. | |
| 2008/0198751 A1 | 8/2008 | Li | |
| 2009/0010153 A1* | 1/2009 | Filsfils et al. | 370/218 |
| 2009/0046723 A1* | 2/2009 | Rahman et al. | 370/395.31 |
| 2009/0135841 A1 | 5/2009 | Vasseur et al. | |
| 2009/0207845 A1 | 8/2009 | Guan | |
| 2009/0225652 A1* | 9/2009 | Vasseur | H04L 41/0677 370/225 |
| 2009/0238084 A1* | 9/2009 | Nadeau | H04L 43/10 370/248 |
| 2010/0142531 A1 | 6/2010 | Kansara et al. | |
| 2010/0169506 A1* | 7/2010 | Krzanowski et al. | 709/238 |
| 2010/0208741 A1 | 8/2010 | Vasseur | |
| 2011/0090786 A1 | 4/2011 | Liu et al. | |
| 2012/0027013 A1 | 2/2012 | Naplerala | |
| 2012/0183000 A1 | 7/2012 | Vasseur et al. | |
| 2012/0195229 A1 | 8/2012 | Chen | |
| 2012/0271928 A1 | 10/2012 | Kern et al. | |
| 2013/0232193 A1 | 9/2013 | Ali et al. | |
| 2014/0007089 A1 | 1/2014 | Bosch et al. | |
| 2014/0010072 A1 | 1/2014 | Gandhi et al. | |

OTHER PUBLICATIONS

Jul. 9, 2014 The International Search Report and the Written Opinion of the International Searching Authority or the Declaration in PCT/US2014/021643, Alcatel Lucent, Applicant, 12 pages.

Jean-Philippe Vasseur, Yuichi Ikejiri: "Reoptimization of MPLS Traffic Engineering Loosely Routed Explicit LSP Paths", Internet Article, Jun. 30, 2003, Retrieved from the Internet: URL:http://tools.ietf.org/pdf/draft-vasseur-mpls-loose-path-reopt-02.pdf [retrieved on Jun. 10, 2014), 10 pages.

Awduche Movaz Networks D et al: "RSVP-TE; Extensions to RSVP for LSP Tunnels; rfc3209.txt", Dec. 1, 2001, XP015008988, ISSN: 0000-0003, 62 pages.

Farrel A et al: "Encoding of Attributes for MPLS LSP Establishment Using Resource Reservation Protocol Traffic Engineering (RSVP-TE); rfc5420.txt", Encoding of Attributes for MPLS LSP Establishment Using Resource Reservation Protocol Traffic Engineering (RSVP-TE); RFC5420.TXT, Internet Engineering Task Force, IETF; Standard, Internet Society (ISOC) 4, Rue Des Falaises CH-1205 Geneva, Switzerland, Feb. 1, 2009, XP015065477, [retrieved on Feb. 4, 2009), 22 pages.

International Search Report and Written Opinion for International Application Serial No. PCT/US2013/050510, dated Oct. 29, 2013, consists of 8 unnumbered pages.

International Search Report and Written Opinion for International Patent Application Serial No. PCT/US2013/051793, mailed Nov. 27, 2013, consists of 8 unnumbered pages.

Aggarwal R., et al., "Extensions to Resource Reservation Protocol—Traffic Engineering (RSVP-TE) for Point-to-Multipoint TE Label Switched Paths (LSPs); rfc4875.txt," May 1, 2005, XP015052419.

Pan P., et al., "Fast Reroute Extensions to RSVP-YE for LSP Tunnels; rfc4090.txt," May 1, 2005, XP015041909.

International Search Report and Written Opinion for International Application No. PCT/US2013/050536, mailed Nov. 13, 2013, Alcatel-Lucent USA Inc., Applicant, 8 pages.

Katz D Ward Juniper Networks D: "Bidirectional Forwarding Detection (BFD); rfc5880.txt", Bidirectional Forwarding Detection (BFD); RFC5880.TXT, Internet Engineering Task Force, IETF; Standard, Internet Society (ISOC) 4, Rue Des Falaises CH-1205 Geneva, Switzerland, Jun. 1, 2010, pp. 1-49, XP015070820, [retrieved on 96/01/2010].

* cited by examiner

SYSTEM, METHOD AND APPARATUS PROVIDING MVPN FAST FAILOVER

CROSS-REFERENCE TO RELATED APPLICATION

This application claims the benefit of U.S. Provisional Patent Application Ser. No. 61/676,796, filed Jul. 27, 2012, entitled SYSTEM, METHOD AND APPARATUS FOR IMPROVED MPLS MANAGEMENT, which application is incorporated herein by reference in its entirety.

FIELD OF THE INVENTION

The invention relates to the field of communication networks such as multi-protocol label switching (MPLS) networks and, more particularly but not exclusively, to fast failover mechanisms.

BACKGROUND

A Multi-Protocol Label Switching (MPLS) network supporting Multicast Virtual Private Networking (VPN) or M-VPN may provide redundancy via a multicast source being dual-homed to the Root PE(s). The dual-homed Root PE(s) may individually originate Provider-Tunnels (P-Tunnels) towards the Leaf PE, and the Leaf PE may source the traffic from either of the upstream dual-homed Root PE nodes.

Various mechanisms exist to enable the Leaf PEs to monitor the status of the P-Tunnels when selecting the upstream PE for a VPN multicast flow. In this manner, Leaf PEs may select a backup P-Tunnel (i.e., a backup Root PE) in response to a failure of a primary or previously selected P-Tunnel. In this manner, a (relatively) fast failure mechanism is implemented for upstream failures. A Multicast VPN fast upstream failover mechanism is described in more detail in Internet Engineering Task Force (IETF) document draft-morin-l3vpn-mvpn-fast-failover.

SUMMARY

Various deficiencies in the prior art are addressed by systems, methods, apparatus and mechanisms of failover indication of a Multicast Virtual Private Networking (MVPN) P-Tunnel at a leaf provider equipment (PE) router. Border Gateway Protocol (BGP) Bidirectional Forwarding Detection (BFD) attributes may be adapted to associate a BFD discriminator with a P-Tunnel terminated at the Leaf PE router such that BFD session status may be used to indicate a tunnel failure condition.

A method according to one embodiment comprises: receiving a Border Gateway Protocol (BGP) Bidirectional Forwarding Detection (BFD) attribute at a Leaf PE router; associating a BFD discriminator included within the BFD attribute with a P-Tunnel terminated at the Leaf PE router; in response to receiving a BFD probe from a Root PE router originating the P-Tunnel, declaring a BFD session associated with the P-Tunnel up; and in response to a failure to receive a BFD probe from the Root PE router originating the P-Tunnel within a predefined time period, declaring the BFD session associated with the P-Tunnel down.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTIONS

Various embodiments adapt Border Gateway Protocol (BGP) extensions and procedures to thereby allow the use of Bidirectional Forwarding Detection (BFD) for Multi Point Networks to provide fast detection and failover for upstream faults in Multicast VPNs. The upstream failures may comprise, illustratively, a failure of any node between a Root PE and a Leaf PE, or a failure between a Multicast-Source and Root PE. In particular, various embodiments enable service providers to implement failover procedures in MVPN systems using BGP.

Various embodiments provide BGP extensions and procedures that allow use of BFD for Multi Point Networks for fast detection and failover for faults in Multicast VPNs. The upstream failures addressed in this proposal can be failure of any node between the Root PE and Leaf PE or failure between the Multicast-Source and Root PE.

Figure 1:
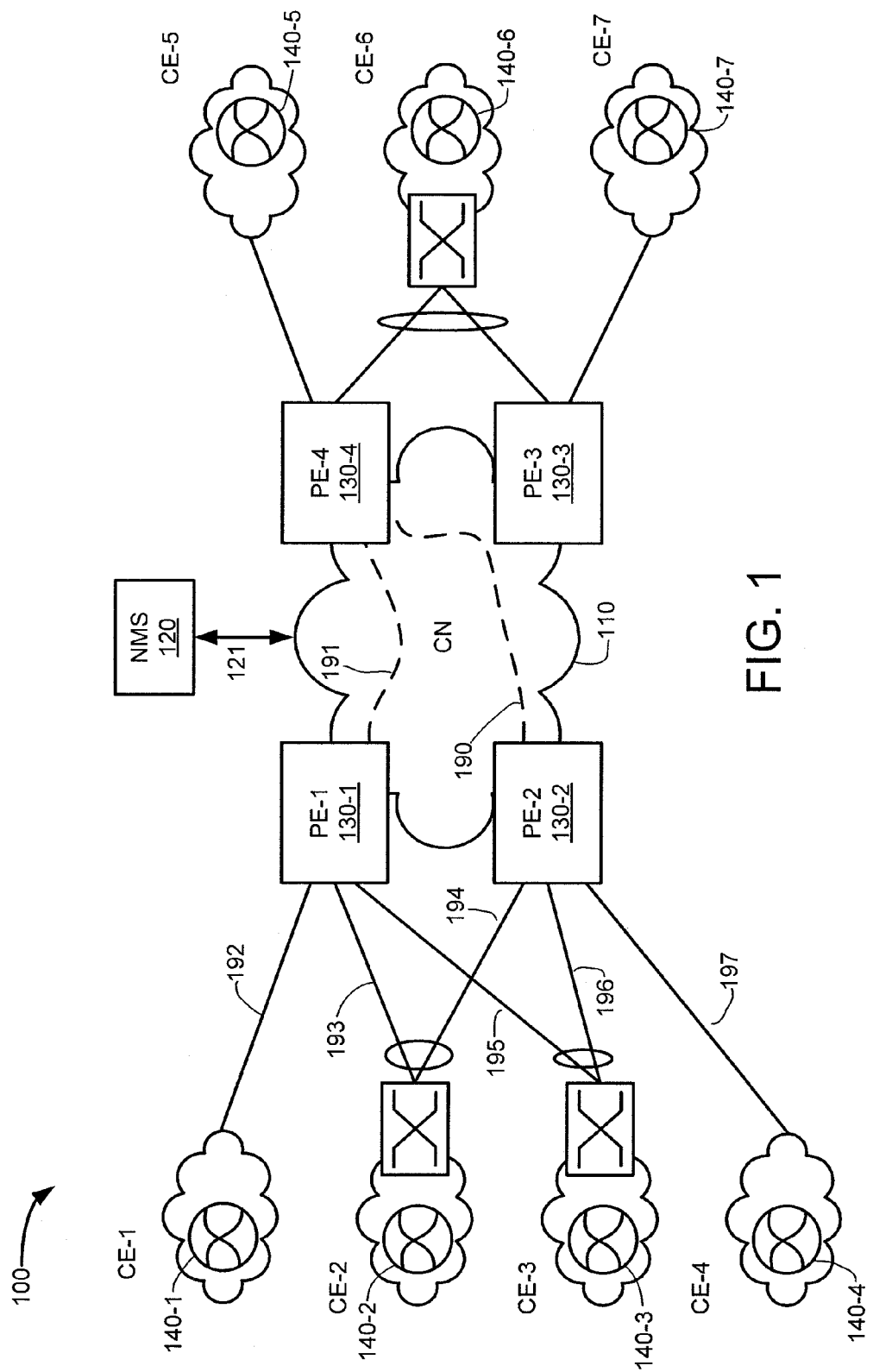
FIG. 1 depicts a high-level block diagram of a communication network architecture benefiting from various embodiments.

FIG. 1 depicts a high-level block diagram of a communication network architecture benefiting from various embodiments. Specifically, the architecture 100 of FIG. 1 provides a Border Gateway Protocol (BGP) Multi-Protocol Label Switching (MPLS) network (BGP MPLS network) supporting Multicast Virtual Private Networking (VPN) or M-VPN. The network may be modified by those skilled in the art to use other MPLS related protocols rather that the exemplary BGP protocol.

The architecture 100 includes an IP/MPLS communication network (CN) 110, a network management system (NMS) 120, a plurality of provider edge (PE) routers (or MPLS Edge Switches (MES)) 130-1 through 130-4 (collectively PE routers 130) and a plurality of customer edge (CE) routers 140-1 through 140-7 (collectively CE routers 140).

In a Multicast VPN deployment, Root PE nodes or routers are connected to respective Leaf nodes or routers by a provider multicast service interface (PMSI) Tunnel containing the tunnel ID used by the Root PE router for transmitting traffic through the MPLS infrastructure of CN 110. An (S,G) entry exists for every flow, which is exchanged using Protocol-Independent Multicast (PIM) running between the PE nodes.

Each of the various CE routers 140-1 through 140-7 is associated with a respective media access control (MAC) and is connected to one or more PE routers 130. For example, in the illustrative embodiment of FIG. 1, PE router 130-1 is connected to CE routers 140-1 through 140-3, PE router 130-2 is connected to CE routers 140-2 through 140-4, PE router 130-3 is connected to CE routers 140-5 and 140-6, and PE router 130-4 is connected to CE routers 140-6 and 140-7. It will be appreciated that more or fewer CE routers 140 may be connected to the various PE routers 130, and that the specific combinations/connections are provided herein for illustrative purposes only.

The NMS 120 is a network management system adapted for performing the various management functions described herein. The NMS 120 is adapted to communicate with nodes of CN 110. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 110 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 3.

Redundancy and Dual-Homed Root PE

For purpose of redundancy, a Multicast-Source may be dual-homed to the Root PE(s). The dual-homed Root PE(s) may individually originate P-Tunnels towards the Leaf PE. The Leaf PE can source the traffic from either of the upstream dual-homed Root PE nodes. In such a deployment, there are two types of failure scenarios; namely, (1) Failure of any network element in the provider network between Root PE and Leaf PE; and (2) Failure of any network element between the Multicast-Source and the Root PEs. In the case of a failure it is desirable to achieve fast failure detection and switchover to the non-failed path for network element.

Various embodiments address these and other failure scenarios using a version of Bidirectional Forwarding Detection (BFD) for Multipoint Networks including new BGP extensions for advertising the BFD parameters which will be used for fast failure detection of scenarios mentioned above.

Referring to FIG. 1, it will be assumed for purposes of this discussion that CE routers 140-1 through 140-4 comprise multicast sources providing content streams and the like to CE routers 140-5 through 140-7. In particular, it is noted that CE routers 140-2 and 140-3 are dual-homed to two PE routers; namely, 130-1 and 130-2.

Each of PE routers 130-1 and 130-2 comprises a Root PE; that is, the PE node closest to the Multicast-Source (either directly connected to Multicast-Source or via some network). Each of PE routers 130-1 and 130-2 is the originating node for a respective P-Tunnel, which P-Tunnel may be Inclusive or Selective.

PE router 130-3 comprises a Leaf PE with respect to CE routers 140-5 and 140-6; that is, the PE Node closest to the Multicast Receiver (either directly connected to Multicast-Source or via some network). In this case, Leaf PE router 130-3 is the terminating node for the P-Tunnels originating from Root PE routers 130-1 and 130-2.

Thus, FIG. 1 depicts a first P-Tunnel 190 between Root PE router 130-2 and Leaf PE router 130-3, and a second P tunnel 191 between Root PE router 130-1 and Leaf PE router 130-3. All of these PEs are part of the same multicast VPN.

As long as C-S is reachable via both Root PEs, the Leaf PE will select one of the PEs connected to C-S as its Upstream PE with respect to C-S, this PE would be referred as "Primary Upstream PE" (e.g., PE 130-1), while the other PE (e.g., PE 130-2) connected to C-S would be referred to as the "Standby Upstream PE". However, if the connectivity to C-S through the Primary Upstream PE becomes unavailable, then the Leaf PE will select the Standby Upstream PE as its Upstream PE with respect to C-S.

If it is desired to use BFD to monitor the status of the P-Tunnel, then there is a need to exchange the BFD discriminator between the Root PE node and Leaf PE. Similarly, if it is desired to use BFD to monitor the status of individual Multicast-Source and P-Tunnel pair, then there is also a need to exchange the BFD discriminator between the Root PE node and Leaf PE to track the Multicast-Source and P-Tunnel pair status.

Various embodiments provide an ability to track the P-Tunnel status or status of the Multicast-Source connected to a Root PE using BFD. This ability may be explicitly configured under the MVPN Service.

Figure 2:
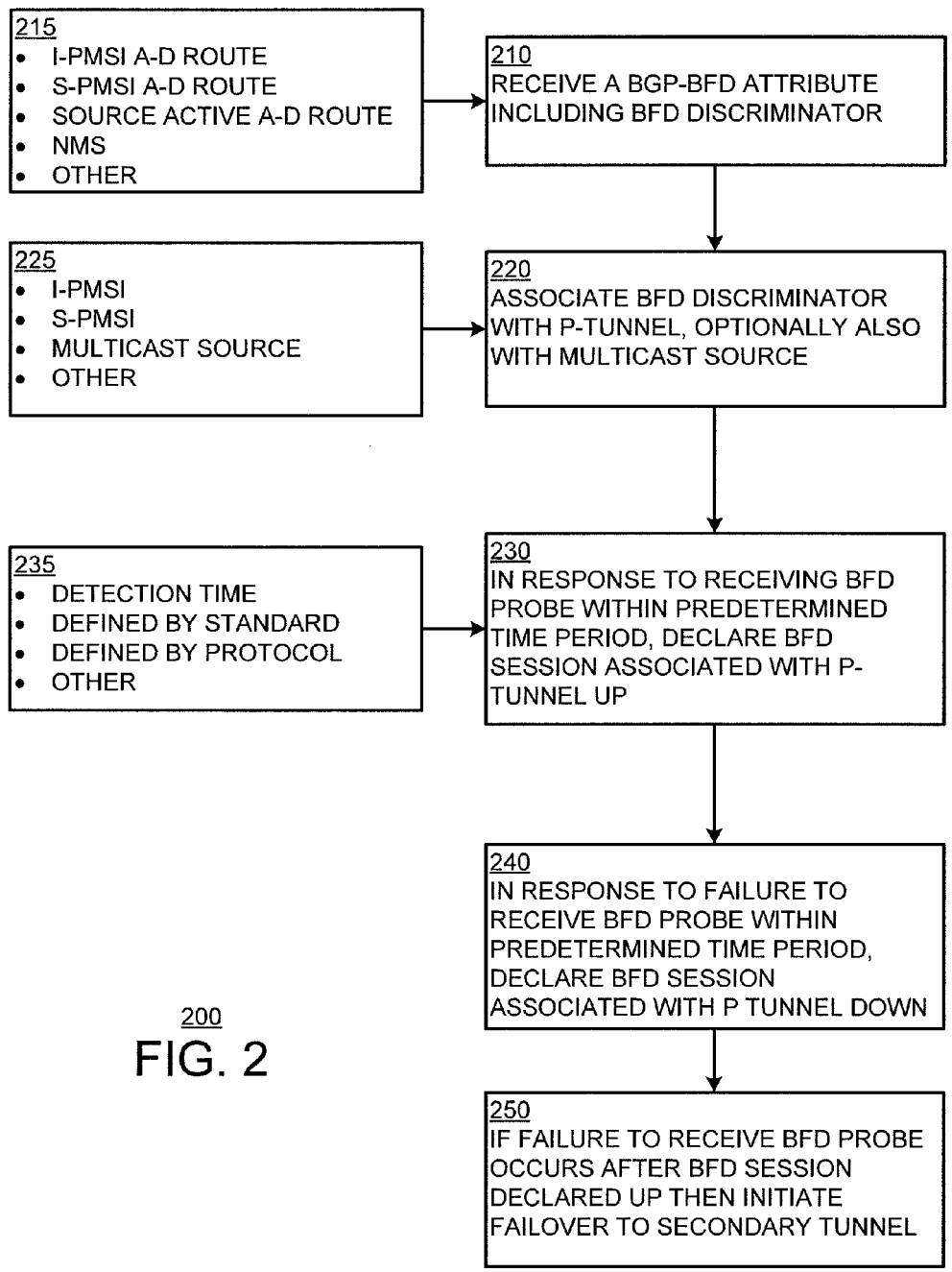
FIG. 2 depicts a flow diagram of a method according to one embodiment.

FIG. 2 depicts a flow diagram of a method according to one embodiment. Specifically, FIG. 2 depicts a method 200 enabling rapid detection of a failure of a P-Tunnel due to failure of a network element in a provider network between a Root PE and Leaf PE, as well as a failure of a network element between a Multicast-Source and Root PEs.

In the case of I-PMSI AND S-PMSI P-Tunnels, a determination that the tunnel is no longer functioning is generally made at the Leaf PE router. This determination is generally indicated by a failure of the Leaf PE node to receive a bidirectional forwarding detection (BFD) probe from, illustratively, the Root PE node within a predetermined period of time.

In the case of multicast P-Tunnels, a determination that the tunnel is no longer functioning may also be made with respect to the multicast source; that is, whether or not the Root PE router can reach the multicast source. If the Multicast-Source is not reachable, then the entire multicast has failed Generally speaking, FIG. 2 is primarily directed to Leaf PE router operations in which the status of a I-PMSI, S-PMSI or multicast P-Tunnel is monitored by a BFD discriminator associated with the P-Tunnel and, in the case of multicast traffic, further associated with the multicast source.

At step 210, the leaf node receives a BGP-BFD attribute including the BFD discriminator. That is, referring to box 215, a BGP-BFD attribute includes a BFD discriminator such as the new BFD discriminator described herein which uniquely identifies the P-Tunnel and, if multicast, the P-Tunnel and Multicast-Source combination.

At step 220, the BFD discriminator included with the BGP-BFD attribute is associated with the P-Tunnel. Again, referring to box 225, the BFD discriminator may also be associated with a Multicast-Source as appropriate.

At step 230, in response to receiving a BFD probe within a predetermined time period, the leaf node PE declares the BFD session associated with the P-Tunnel to be up or active. Referring to box 235, the predetermined time period may comprise a predefined detection time period, a time period defined by a standard, a time period defined by a protocol and so on. The predetermined time period may be adapted in response to network congestion and/or other network conditions associated with reduced network performance. This adaptation may be explicitly provided via network management system profile updates and the like. This adaptation may also be provided by local mechanisms, such as monitored or calculated performance metrics or conditions associated with reduced performance. In various embodiments, the predetermined time period is adapted in response to a rolling average or other statistical processing of time intervals associated with previously received BFD probes.

At step 240, in response to a failure to receive a BFD probe within the predetermined time period, the Leaf PE router declares the BFD session associated with the P-Tunnel to be down or inactive. This status of being down or inactive may be due to an administrative change such as a management decision to stop monitoring the P-Tunnel, a failure of a network element or link between the Root PE router and Leaf PE router, a failure of a network element or link between a Multicast-Source and the Root PE router and so on.

At step 250, the failure to receive the BFD probe occurs after the BFD session is declared up, then the Leaf PE router initiates a failover to a secondary tunnel. In addition, in the case of a multicast embodiment, where the Root PE node determines that a Multicast-Source is no longer reachable after the BFD session has been declared up or active, then the Root PE router advertises this failure to the Leaf PE router. Additional details associated with the various steps will now be described in more detail.

New BGP-BFD Attribute

Various embodiments address the fast failure detection and monitoring issues discussed above using a version of Bidirectional Forwarding Detection (BFD) for Multipoint Networks including new BGP extensions for advertising the BFD parameters. In some embodiments, a new BGP attribute defined herein as the "BGP-BFD attribute" is provided. This is an optional BGP attribute having a format including a one octet flags field and a two octet BFD discriminator field (though other field sizes may be used) defined as follows:

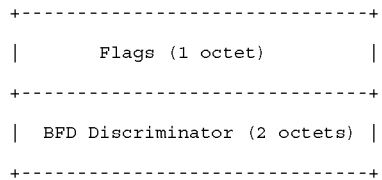

The Flags field illustratively comprises eight reserved bits which will be discussed in more detail below. The BFD discriminator field illustratively comprises 16 bits which are used to provide a local discriminator for the specific BFD session and to uniquely identify the specific BFD session. In various embodiments, the BFD discriminator is a nonzero number unique across all BFD sessions in a particular system or network. In various environments, to improve security the BFD discriminator is a randomly generated unique number.

Tunnel Status Tracking for I-PMSI P-Tunnel

At a Root PE, when it is desired to track the P-Tunnel status using BFD, the Root PE includes the BGP-BFD Attribute in the I-PMSI A-D Route.

If a P-Tunnel is already signaled, and then it is desired to track the P-Tunnel status using BFD, the I-PMSI A-D Route is retransmitted with the same attributes as before, including the BGP-BFD Attribute.

If P-Tunnel is already signaled and P-Tunnel status tracked using BFD, and then it is desired to stop tracking P-Tunnel status using BFD, the I-PMSI A-D Route is retransmitted with the same attributes as before, but the BGP-BFD Attribute is excluded.

At a Leaf PE, upon receiving the BFD attribute in the I-PMSI A-D Route, the Leaf PE associates the received discriminator with the P-Tunnel originating from the Root PE. Once the Leaf PE starts receiving BFD probes from the Root PE with the associated discriminator, the BFD session is declared up or active and may be used to track the health of the P-Tunnel. In one embodiment, the BFD attribute is received at the Leaf PE router via a network management system (NMS) control channel.

If the Leaf PE does not receive BFD probes for a P-Tunnel from the Root PE within a defined Detection Time, the BFD session is brought down by the Leaf PE and the P-Tunnel associated with the discriminator is declared down or inactive. The Leaf PE may then initiate a switchover of the traffic from the Primary P-Tunnel to the Standby P-Tunnel.

While the Leaf PE's P-Tunnel is already up or active, if the Leaf PE receives a new I-PMSI A-D Route with BGP-BFD attribute, then it accepts the I-PMSI A-D Route and associates the discriminator with the active P-Tunnel. When the Leaf PE starts getting BFD probes from the Root PE with the associated discriminator, the BFD session is declared up or active.

While the Leaf PE's P-Tunnel is already up and tracked with BFD, if the Leaf PE receives a new I-PMSI A-D Route without the BGP-BFD attribute, then it accepts the I-PMSI A-D Route and the BFD session is declared administratively down or inactive. In this case, traffic should not be switched to the Standby P-Tunnel.

Tunnel Status Tracking for S-PMSI P-Tunnel

Procedures for tunnel status tracking for a S-PMSI P-Tunnel are the same as described above with respect to tunnel status tracking of a I-PMSI P-Tunnel, except that the BGP-BFD Attribute would be sent in S-PMSI A-D Route.

At a Root PE, when it is desired to track the P-Tunnel status using BFD, the Root PE includes the BGP-BFD Attribute in the S-PMSI A-D Route.

If a P-Tunnel is already signaled, and then it is desired to track the P-Tunnel status using BFD, the S-PMSI A-D Route is retransmitted with the same attributes as before, but including BGP-BFD Attribute.

If P-Tunnel is already signaled and P-Tunnel status tracked using BFD, and then it is desired to stop tracking P-Tunnel status using BFD, the S-PMSI A-D Route is retransmitted with the same attributes as before, but the BGP-BFD Attribute is excluded.

At a Leaf PE, upon receiving the BFD attribute in the S-PMSI A-D Route, the Leaf PE associates the received discriminator with the P-Tunnel originating from the Root PE. Once the Leaf PE starts getting BFD probes from the Root PE with the associated discriminator, the BFD session is declared up or active and may be used to track the health of the P-Tunnel.

If the Leaf PE does not receive BFD probes for a P-Tunnel from the Root PE within a defined Detection Time, the BFD session is brought down by the Leaf PE and the P-Tunnel associated with the discriminator is declared down or inactive. The Leaf PE then may then initiate a switchover of the traffic from the Primary P-Tunnel to the Standby P-Tunnel.

While the Leaf PE's P-Tunnel is already up or active, if the Leaf PE receives a new S-PMSI A-D Route with BGP-BFD attribute, then it accepts the S-PMSI A-D Route and associates the discriminator with the P-Tunnel. When the Leaf PE starts receiving BFD probes from the Root PE with the associated discriminator, the BFD session is declared up.

While the Leaf PE's P-Tunnel is already up and tracked with BFD, if the Leaf PE receives a new S-PMSI A-D Route without the BGP-BFD attribute, then it accepts the S-PMSI A-D Route and the BFD session is declared administratively down or inactive. In this case, traffic should not be switched to the Standby P-Tunnel.

Tunnel Status Tracking for Multicast P-Tunnel

At a Root PE, when it is desired to track the connectivity status of Multicast-Source at the Root PE(s), the Root PE includes the BGP-BFD Attribute in the Source Active A-D Route such as specified in Internet Engineering Task Force (IETF) Request for Comment (RFC) 6514.

The discriminator advertised in BGP-BFD Attribute in the Source Active A-D Route is to be used to track the Multicast-Source and the P-Tunnel from the Root PE that originated the Source Active A-D Route.

When the Root PE detects that the Multicast-Source is reachable, the Root PE will start BFD probes over the P-Tunnel for the P-Tunnel and Multicast-Source combination.

At a Leaf PE, upon receiving the BFD attribute in the Source Active A-D Route, the Leaf PE associates the received discriminator with the P-Tunnel and Multicast-Source combination. Once the Leaf PE starts receiving BFD probes from the Root PE with the discriminator, the BFD session is declared up or active and may be used to track the health of the P-Tunnel and Multicast-Source combination.

When the Root PE detects that the Multicast-Source is no longer reachable, it will advertise the BFD Status for P-Tunnel and Multicast-Source combination to be down by signaling it in DIAG field of BFD. The Leaf PE, upon receiving the BFD status down advertisement for the P-Tunnel and Multicast-Source combination, declares that the source is unreachable through the given PMSI and initiates a switchover of the multicast traffic from the Primary Tunnel to the Standby Tunnel.

Figure 3:
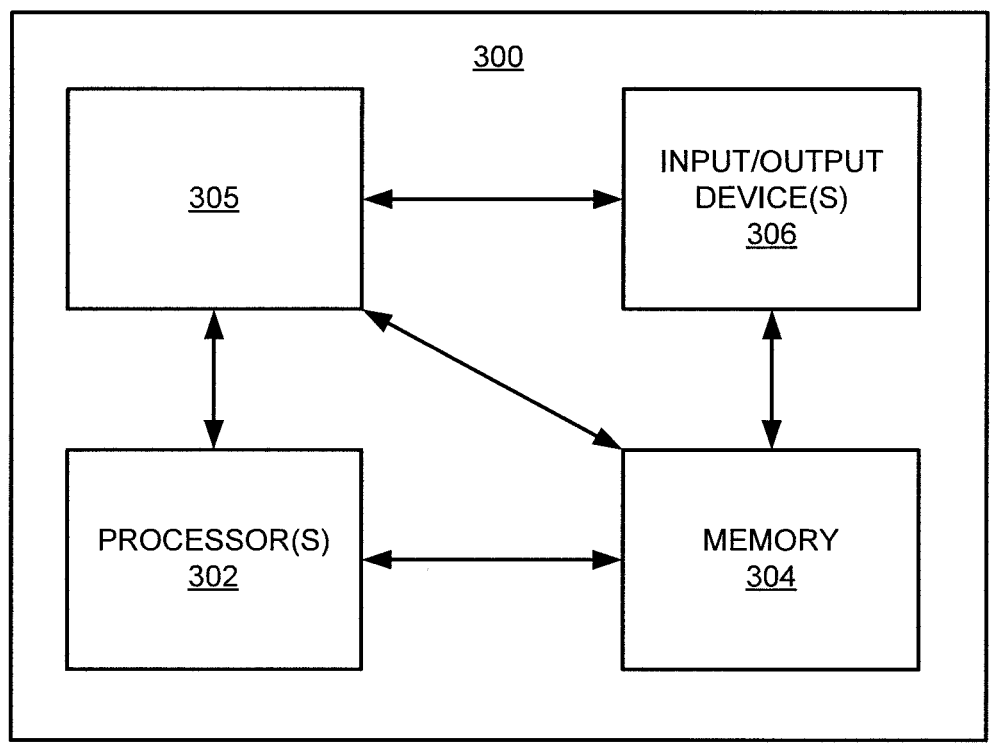
FIG. 3 depicts a high-level block diagram of a computer suitable for use in performing functions described herein.

FIG. 3 depicts a high-level block diagram of a computer suitable for use in performing functions described herein.

As depicted in FIG. 3, computer 300 includes a processor element 303 (e.g., a central processing unit (CPU) and/or other suitable processor(s)), a memory 304 (e.g., random access memory (RAM), read only memory (ROM), and the like), a cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the cooperating process 305 can be loaded into memory 304 and executed by processor 303 to implement the functions as discussed herein. Thus, cooperating process 305 (including associated data structures) can be stored on a computer readable storage medium, e.g., RAM memory, magnetic or optical drive or diskette, and the like.

It will be appreciated that computer 300 depicted in FIG. 3 provides a general architecture and functionality suitable for implementing functional elements described herein or portions of the functional elements described herein.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

While the foregoing is directed to various embodiments of the present invention, other and further embodiments of the invention may be devised without departing from the basic scope thereof. As such, the appropriate scope of the invention is to be determined according to the claims.

What is claimed is:

1. A method of failover indication of a Multicast Virtual Private Networking (MVPN) P-Tunnel terminated at a leaf provider equipment (PE) router, the method comprising:
  receiving a Border Gateway Protocol (BGP) Bidirectional Forwarding Detection (BFD) attribute at the leaf PE router, wherein the BGP BFD attribute includes a BFD discriminator of a BFD session to be established between the leaf PE router and a root PE router originating the MVPN P-tunnel;
  associating the BFD discriminator of the BFD session with the MVPN P-Tunnel; and
  declaring the BFD session associated with the MVPN P-tunnel down in response to a failure to receive, from the root PE router within a predefined time period, a BFD probe including the BFD discriminator associated with the MVPN P-Tunnel.

2. The method of claim 1, further comprising:
  declaring the BFD session associated with the MVPN P-tunnel up in response to receiving, from the root PE router originating the MVPN P-Tunnel, a BFD probe including the BFD discriminator associated with the MVPN P-Tunnel.

3. The method of claim 1, wherein, if the BFD session associated with the MVPN P-Tunnel is up, the response to the failure to receive the BFD probe further comprises declaring the MVPN P-Tunnel as down.

4. The method of claim 1, wherein the response to the failure to receive the BFD probe further comprises initiating a switchover of traffic from the MVPN P-Tunnel to a secondary MVPN P-Tunnel.

5. The method of claim 1, wherein the BGP BFD attribute is received at the leaf PE router via the MVPN P-Tunnel.

6. The method of claim 1, wherein the BGP BFD attribute is received at the leaf PE router via a network management system (NMS) control channel.

7. The method of claim 1, wherein the BGP BFD attribute is included within one of a received I-PMSI A-D Route and a received S-PMSI A-D Route.

8. The method of claim 7, further comprising accepting the received I-PMSI A-D Route or the received S-PMSI A-D Route.

9. The method of claim 7, further comprising:
  in response to receiving a new I-PMSI A-D Route or a new S-PMSI A-D Route that does not include the BGP BFD attribute, declaring the BFD session associated with the MVPN P-Tunnel administratively down.

10. The method of claim 1, further comprising:
  associating the BFD discriminator included within the BGP BFD attribute with a Multicast-Source associated with the root PE router such that the BFD discriminator is associated with a combination of the MVPN P-tunnel and the Multicast-Source.

11. The method of claim 10, further comprising:
in response to receiving advertising of a BFD status for the combination of the MVPN P-Tunnel and the Multicast-Source in which the BFD status is indicated as being down, declaring the Multicast-Source unreachable and initiating a switchover of traffic from the MVPN P-Tunnel to a secondary MVPN P-Tunnel.

12. The method of claim 11, wherein the advertising of the BFD status for the combination of the MVPN P-Tunnel and the Multicast-Source is provided in a DIAG field of BFD.

13. The method of claim 10, wherein the BGP BFD attribute is included within a Source Active A-D Route.

14. The method of claim 1, wherein the predefined time period is defined according to a standard or a protocol.

15. The method of claim 1, wherein the predefined time period is adapted in response to one or more network conditions associated with reduced network performance.

16. The method of claim 1, wherein the predefined time period is adapted in response to a rolling average of time intervals associated with previously received BFD probes.

17. An apparatus configured to provide failover indication of a Multicast Virtual Private Networking (MVPN) P-Tunnel terminated at a leaf provider equipment (PE) router, the apparatus comprising:
a processor and a memory communicatively connected to the processor, the processor configured to:
receive a Border Gateway Protocol (BGP) Bidirectional Forwarding Detection (BFD) attribute at the leaf PE router, wherein the BGP BFD attribute includes a BFD discriminator of a BFD session to be established between the leaf PE router and a root PE router originating the MVPN P-tunnel;
associate the BFD discriminator of the BFD session with the MVPN P-Tunnel; and
declare the BFD session associated with the MVPN P-tunnel down in response to a failure to receive, from a Root the root PE router within a predefined time period, a BFD probe including the BFD discriminator associated with the MVPN P-Tunnel.

18. A non-transitory computer-readable storage medium including software instructions which, when executed by a processor, cause the processor to perform a method of failover indication of a Multicast Virtual Private Networking (MVPN) P-Tunnel terminated at a leaf provider equipment (PE) router, the method comprising:
receiving a Border Gateway Protocol (BGP) Bidirectional Forwarding Detection (BFD) attribute at the leaf PE router, wherein the BGP BFD attribute includes a BFD discriminator of a BFD session to be established between the leaf PE router and a root PE router originating the MVPN P-tunnel;
associating the BFD discriminator of the BFD session with the MVPN P-Tunnel; and
declaring the BFD session associated with the MVPN P-tunnel down in response to a failure to receive, from the root PE router within a predefined time period, a BFD probe including the BFD discriminator associated with the MVPN P-Tunnel.

19. A computer program product comprising software instructions which, when executed by a computer, cause the computer to perform a method of failover indication of a Multicast Virtual Private Networking (MVPN) P-Tunnel terminated at a leaf provider equipment (PE) router, the method comprising:
receiving a Border Gateway Protocol (BGP) Bidirectional Forwarding Detection (BFD) attribute at the Reafflleaf PE router, wherein the BGP BFD attribute includes a BFD discriminator of a BFD session to be established between the leaf PE router and a root PE router originating the MVPN P-tunnel;
associating the BFD discriminator of the BFD session with the MVPN P-Tunnel; and
declaring the BFD session associated with the MVPN P-tunnel down in response to a failure to receive, from the root PE router within a predefined time period, a BFD probe including the BFD discriminator associated with the MVPN P-Tunnel.

20. An apparatus, comprising:
a processor and a memory communicatively connected to the processor, the processor configured to:
receive, at a leaf provider equipment (PE) router terminating a Multicast Virtual Private Networking (MVPN) P-Tunnel, a Border Gateway Protocol (BGP) Bidirectional Forwarding Detection (BFD) attribute including a BFD discriminator of a BFD session to be established between the leaf PE router and a root PE router originating the MVPN P-tunnel;
associate the BFD discriminator of the BFD session with the MVPN P-Tunnel; and
declare the BFD session associated with the MVPN P-tunnel active in response to receiving, from the root PE router, a BFD probe including the BFD discriminator associated with the MVPN P-Tunnel.

21. An apparatus, comprising:
a processor and a memory communicatively connected to the processor, the processor configured to:
receive, at a leaf provider equipment (PE) router terminating a Multicast Virtual Private Networking (MVPN) P-Tunnel, a Border Gateway Protocol (BGP) Bidirectional Forwarding Detection (BFD) attribute including a BFD discriminator of a BFD session, wherein the BGP BFD attribute is received within an I-PMSI A-D Route or an S-PMSI A-D Route;
associate the BFD discriminator of the BFD session with the MVPN P-Tunnel; and
declare the BFD session associated with the MVPN P-tunnel down in response to a failure to receive, from a root PE router originating the MVPN P-Tunnel within a predefined time period, a BFD probe including the BFD discriminator associated with the MVPN P-Tunnel.

* * * * *